United States Patent [19]
Eberle

[11] 3,859,285
[45] Jan. 7, 1975

[54] 10, 11-DIHYDRO-5H-BENZO (4,5) CYCLOHEPTA (1,2-B) PYRAZINES
[75] Inventor: Marcel K. Eberle, Madison, N.J.
[73] Assignee: Sandoz-Wander, Inc., Hanover, New Jersey
[22] Filed: Nov. 9, 1973
[21] Appl. No.: 414,365

[52] U.S. Cl. ........... 260/250 BC, 260/590, 424/250
[51] Int. Cl. ............................................ C07d 51/76
[58] Field of Search .................. 260/250 R, 250 BC

[56] References Cited
UNITED STATES PATENTS
3,301,863  1/1967  Villani ............................ 260/250 R OTHER PUBLICATIONS
Katritzky et al., Advances In Heterocyclic Chemistry, Vol. 14, Academic Press, New York, 1972, p. 113.

Primary Examiner—Donald G. Daus
Assistant Examiner—Ralph D. McCloud
Attorney, Agent, or Firm—Gerald D. Sharkin; Robert S. Honor

[57] ABSTRACT

Substituted or unsubstituted 10,11-dihydro-5H-benzo[4,5]cyclohepta[1,2-b] pyrazines, e.g. 10,11-dihydro-5H-benzo[4,5]cyclohepta[1,2-b] pyrazine, are prepared by treating a 6-hydroxy-7H-benzocyclohepten-7-one with ethylenediamine, and are useful as sedative-hypnotic agents, minor tranquilizers and anti-convulsant agents.

5 Claims, No Drawings

10,11-DIHYDRO-5H-BENZO (4,5) CYCLOHEPTA (1,2-B) PYRAZINES

This invention relates to 10,11-dihydro-5H-benzo[4,5]cyclohepta [1,2-b]pyrazines which exhibit sedative-hypnotic, minor tranquilizer and anticonvulsant activity. In particular, it relates to substituted or unsubstituted 10,11-dihydro-5H-benzo[4,5]cyclohepta[1,2-b]pyrazines, their preparation, pharmaceutically acceptable acid addition salts and intermediates thereof.

The compounds of this invention may be represented by the following structural formula:

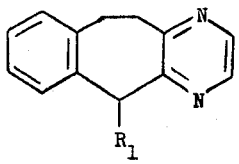

(I)

where $R_1$ is hydrogen, or lower alkyl, i.e. lower alkyl having 1 to 4 carbon atoms, e.g. methyl, ethyl, isopropyl and the like.

The compounds of formula (I) in which $R_1$ represents lower alkyl are prepared according to the following reaction scheme:

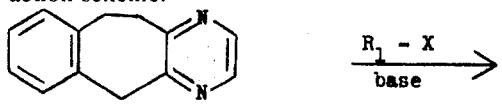

where $R_1$ is lower alkyl as defined above, and X is halo having an atomic weight of about 35 to 127.

The compounds of (Ia) are prepared by treating a compound of the forumula (Ib) with an alkyl halide, e.g. methyliodide, ethyliodide, methylbromide and the like, preferably methyliodide in the presence of an inorganic base such as an alkali metal hydroxide, e.g., sodium hydroxide, potassium hydroxide and the like, or sodium hydride, the latter being especially preferred. The reaction is carried out in the presence of an inert organic solvent such as the lower alkanols, e.g., methanol, ethanol and the like, dimethylacetamide or dimethylformamide, the latter being especially preferred. The temperature of the reaction is not critical, but is is preferred that the reaction be carried out at a temperature between about −30° to 150°C., preferably from about 20° to 30°C. The reaction may be run from about 1 to 5 hours, preferably 2 to 3 hours. The product is recovered using conventional techniques, e.g., recrystallization.

The compounds of formula (I) in which $R_1$ represents hydrogen are prepared according to the following reaction scheme:

The compound of formula (Ib) is prepared by condensing a compound of the formula (II) with ethylenediamine. Although a solvent is not required, it is preferred that the reaction be carried out in the presence of an inert organic solvent such as the aromatic hydrocarbons, e.g. benzene, toluene and the like, or an excess of ethylenediamine, the latter being especially preferred. The temperature of the reaction is not critical, but it is preferred that the reaction be run at a temperature between about 50° to 200°C., preferably the reflux temperature of the solvent. The reaction may be run from about 1 to 5 hours, preferably 2 to 3 hours. The product is recovered using conventional techniques, e.g., distillation.

The compound of formula (II) is known and may be prepared by methods described in the literature.

The compounds of formula (I) possess pharmacological activity. In particular, the compounds are useful as central nervous system depressants, especially as sedative-hypnotics, minor tranquilizers and anticonvulsants as indicated by 1) their ability to produce docility in behavior tests in mice given 25 to 200 mg/kg of animal body weight, i.p. of the test compound according to the 30-word adjective check sheet system basically as described by Irwin S. (Gordon Research Conference, Medicinal Chemistry, 1959) and Chen (Symposium on Sedative and Hypnotic Drugs, Williams and Wilkins, 1954); 2) by their ability to antagonize tonic convulsions and death in mice given 50 to 250 mg/kg, i.p. of the test compound followed one hour later by 50 mg/kg i.p. of N-sulfamoylazepine; 3) by the hexobaribtal reinduction method of Winter, J. Pharmacol and Exp.

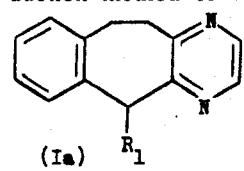

(Ia)

Therap., 94, 7–11, 1948 in which reinduction of anesthesia after recovery from hexobarbital induced anaesthesia is used to determine sedative-hypnotic activity in mice given 70 mg/kg of animal body weight, i.p. of hexobarbital followed immediately after the mice regain their righting reflexes by 25 to 200 mg/kg of animal body weight, i.p. of the test compound; and 4) by scoring for loss of righting reflex according to the method of Reed-Muench (American Journal of Hygiene, 27: 493–497, 1938, in which mice are administered Thioridazine at 12.5 mg/kg i.p., and immediately after administration of Thioridazine, graded doses of test compound are administered, so that the mice receive doses in a volume of 0.1 mg/10 g. body weight, and at 30 minutes after dosing the mice are recorded for loss of righting reflex.

For such usage, the compounds of formula (I) may be administered orally or parenterally as such or admixed with conventional pharmaceutical carriers. They may be administered orally in such forms as tablets, dispersible powders, granules, capsules, syrups and elixirs, and parenterally as solutions e.g., a sterile injectable aqueous solution. The compositions for oral use may

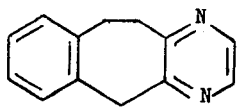

(Ib)

contain one or more conventional adjuvants, such as sweetening agents, in order to provide an elegant and palatable preparation. Tablets may contain the active ingredient in admixture with conventional pharmaceutically acceptable exicipients, e.g., inert diluents, such as calcium carbonate, sodium carbonate, lactose, and talc, granulating and disintegrating agents, e.g., starch and alginic acid, binding agents, e.g., starch, gelatin and acacia, and lubricating agents, e.g., magnesium stearate, steaic acid and talc. The tablets may be uncoated or coated by known techniques to delay disintegration and absorption in the gastrointestinal tract and thereby provide a sustained action over a longer period. Similarly, suspensions, syrups, and elixirs, may contain the active ingredient in admixture with any of the conventional excipients utilized for the preparation of such compositions, e.g., suspending agents (lecithin, polyoxyethylene stearate and polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art. All these pharmaceutical preparations may contain up to about 90 percent of the active ingredient in combination with the carrier or adjuvant.

Furthermore, the compounds of formula (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of the acid addition salts are the mineral acid salts, such as the hydrochloride, hydrobromide, sulfate and phosphate and the like and the organic acid salts such as succinate, benzoate, acetate, p-toluenesulfonate, benzenesulfonate, and the like.

Depending upon the compound employed and the mode of administration, the exact dosage utilized may vary. However, in general, satisfactory results are obtained when the compounds are administered as sedative-hypnotics, minor tranquilizers or anti-convulsants orally at a daily dosage of from about 4 mg. to 200 mg/kg of animal body weight. This daily dosage is preferably given in divided doses, e.g., 2 to 4 times a day, or in sustained release form. For most large mammals, the total daily dosage is from about 300 to 2,000 mg.; and dosage forms suitable for internal administration comprise from about 75 mg. to about 1,000 mg. of the compound in admixture with a solid or liquid pharmaceutical carrier or diluent.

Tablets and capsules containing the ingredients indicated below may be prepare by conventional techniques and are useful as central nervous system depressants at a dose of one tablet or capsule 2 to 4 times a day.

| Ingredient | Weight Mg. |
|---|---|
| 10,11-dihydro-5H-benzo[4,5]cyclohepta[1,2-b] pyrazine | 100 |
| inert solid diluent (starch, lactose, kaolin) | 200 |

EXAMPLE 1

10,11-dihydro-5-methyl-5H-benzo[4,5]cyclohepta[1,2-b] pyrazine

To a mixture of 0.2 g. 57 percent sodium hydride (0.004 mole) washed with anhydrous ether in 10 ml. of dimethylformamide and 0.5 g. (0.002 mole) of 10,11-dihydro-5H-benzo[4,5]cyclohepta[1,2-b] pyrazine in 10 ml. dimethylformamide under a nitrogen atmosphere there is added slowly 4.0 g. of methyliodine at room temperature for 2 hours. Thereafter the dimethylformamide is removed in vacuo and the resulting residue is dissolved in a water and methylene chloride mixture. The resulting aqueous phase is washed again with methylene chloride, and the resulting extracts are combined, dried over anhydrous sodium sulfate and evaporated to give a black oil. The oil residue is then chromatographed on silica gel, using methylene chloride as an eluant. The fractions are crystallized and the product is then recrystallized from ethanol/water to give 10,11-dihydro-5-methyl-5H-benzo[benzo 4,5]cyclohepta[1,2-b] pyrazine; m.p. 75°-76°C.

EXAMPLE 2

10,11-dihydro-5H-benzo[4,5]cyclohepta[1,2-b] pyrazine

A mixture of 3.4 g. of 6-hydroxy-7H-benzocyclohepten-7-one (0.02 mole) and 1.0 g. of ethylenediamine dihydrochloride (0.008 mole) in 50 ml. of ethylenediamine is heated to reflux for 2 hours. The excess ethylenediamine is evaporated in vacuo and the resulting residue is dissolved in chloroform, washed with 2N sodium hydroxide and dried over anhydrous potassium carbonate. The excess solvent is evaporated under reduced pressure and the resulting residue distilled in a kugelrohr to give 10,11-dihydro-5H-benzo[4,5]cyclohepta[1,2-b] pyrazine, b.p. 100° to 125°C. at 0.08 mm.

What is claimed is:

1. A compound of the formula

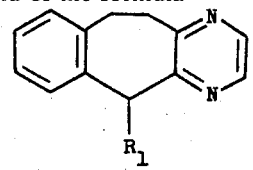

where $R_1$ is hydrogen, or lower alkyl having 1 to 4 carbon atoms, or a pharmaceutically acceptable acid addition salt thereof.

2. A compound of claim 1 in free base form.

3. A compound according to claim 1 in which $R_1$ represents lower alkyl.

4. The compound of claim 1 which is 10,11-dihydro-5H-benzo[4,5] cyclohepta[1,2-b] pyrazine.

5. The compound of claim 1 which is 10,11-dihydro-5-methyl-5H-benzo[4,5]cyclohepta[[1,2-b] pyrazine.

* * * * *